United States Patent
Leonard et al.

(10) Patent No.: US 8,127,305 B1
(45) Date of Patent: Feb. 28, 2012

(54) REROUTING MESSAGES TO PARALLEL QUEUE INSTANCES

(75) Inventors: Mark Leonard, Olathe, KS (US); Terriss Ford, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 926 days.

(21) Appl. No.: 12/139,937

(22) Filed: Jun. 16, 2008

(51) Int. Cl.
*G06F 9/50* (2006.01)
*G06F 9/54* (2006.01)
*G06F 13/38* (2006.01)
*G06F 15/163* (2006.01)
*G06F 11/00* (2006.01)

(52) U.S. Cl. ........ 719/314; 718/105; 709/226; 714/100; 714/1; 714/2; 714/3; 714/4.1; 714/4.11

(58) Field of Classification Search .................... None
See application file for complete search history.

(56) References Cited

U.S. PATENT DOCUMENTS

| | | | |
|---|---|---|---|
| 2003/0182464 A1* | 9/2003 | Hamilton et al. | 709/314 |
| 2006/0129684 A1* | 6/2006 | Datta | 709/229 |

OTHER PUBLICATIONS

"Open VMS System Manager's Manual", Mar. 2001, Compaq.*

* cited by examiner

*Primary Examiner* — Qing Wu

(57) ABSTRACT

A method, system, and medium are provided for re-routing messages from a particular parallel queue instance that is experiencing below normal message throughput. The messages are re-routed to the other parallel queue instances by disabling the slow queue instance. A series of determinations are made, prior to disabling the queue instance, to confirm that disabling the queue instance is the preferred response to the decreased throughput for the queue instance.

20 Claims, 5 Drawing Sheets

REROUTING MESSAGES TO PARALLEL QUEUE INSTANCES

SUMMARY

The present invention is defined by the claims below. Embodiments of the present invention provide for rerouting messages away from one of multiple parallel queue instances by disabling one of the parallel queue instances. Embodiments of the present invention have several practical applications in the technical arts including optimizing message delivery in a messaging-middleware environment. Specifically, one embodiment disables a queue instance in response to detecting a decreased throughput in the queue instance and upon determining a series of criteria are satisfied.

In a first illustrative embodiment, one or more computer-readable media having computer-executable instructions embodied thereon for performing a method of automatically disabling a primary queue instance in response to a decrease in throughput for the primary queue instance is described. The method includes retrieving characteristics of the primary queue instance including a number of messages entering the primary queue instance during a period of time, a number of messages exiting the primary queue instance during the period of time, and a number of application interfaces operating to remove messages from the primary queue instance. The method also includes determining that the number of application interfaces operating is greater than a threshold number of application interfaces. The method also includes calculating the throughput for the primary queue instance using the number of messages entering the primary queue instance and the number of messages exiting the primary queue instance. The method further includes determine that the throughput is less than a threshold throughput. The method further includes determining how many parallel queue instances are presently available, wherein a parallel queue instance is available if the parallel queue instance is online and not alarming, and wherein the parallel queue instances and the primary queue instance facilitate transmission of a first type of message between a first program and a second program. The method also includes calculating an aggregate message-throughput capacity for available parallel queue instances. The method also includes retrieving a projected message volume across the parallel queue instances plus the primary queue instance for a period of time during which the primary queue instance may be disabled. The method further includes determining that the aggregate message-throughput capacity for the parallel queue instances is greater than the projected message volume for the period of time during which the primary queue instance may be disabled. The method further includes determining that the primary queue instance is oriented externally, wherein the primary queue instance is oriented externally if the messages from the primary queue instance are transferred to a single backend application and determining that a backend status for the primary queue instance is normal. The method also includes, upon making the above determinations, changing an enablement status of the primary queue instance to disabled.

In another illustrative embodiment, one or more computer-readable media having computer-executable instructions embodied thereon for performing a method of terminating a primary queue instance that has at least one parallel queue instance when a malfunction condition in the primary queue instance is detected is described. The method includes determining that a message throughput for the primary queue instance is less than a threshold throughput. And, determining that greater than a threshold number of application interfaces are operating to remove messages from the primary queue instance. And determining that the primary queue instance is externally oriented, wherein the primary queue instance is externally oriented if the messages from the primary queue instance are transferred to only one backend application. The method also includes determining that a aggregate message-throughput capacity for all parallel queue instances is greater than a projected message volume, wherein the aggregate message-throughput capacity and the projected message volume are both based on a single time period. The method includes determining that a backend status for the primary queue instance is normal. The method further includes, upon making the above determinations, disabling the primary queue instance.

In a third illustrative embodiment, one or more computer-readable media having computer-executable instructions embodied thereon for performing a method of disabling a primary queue instance upon receiving an indicating the primary queue instance is malfunctioning is described. The method includes receiving an instruction to disable the primary queue instance and determining a number of application interfaces that are operating to remove messages from the primary queue instance. If the number of application interfaces is less than a threshold number, then activating an additional application-interface instance and determining a message throughput for the primary queue instance. The method further includes activating additional application interfaces until the number of application interfaces that are operating reaches the threshold number or the message throughput for the primary queue instance is greater than a threshold throughput. The method also includes determining that the number of application interfaces operating to remove the messages from the primary queue instance is greater than the threshold number. The method also includes determining that available parallel queue instances have an aggregate message-throughput capacity sufficient to handle expected message traffic during a period of time contemporaneous with disabling the primary queue instance. The method further includes determining that the primary queue instance is externally oriented. The primary queue instance is externally oriented if the messages from the primary queue instance are transferred to a single backend application. The method further includes determining that a backend status for the primary queue instance is normal and disabling the primary queue instance.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The present invention will be better understood from the detailed description provided below and from the accompanying drawings of various embodiments of the invention, which describe, for example, rerouting messages from a malfunctioning queue to other instances of the queue. The detailed description and drawings, however, should not be read to limit the invention to the specific embodiments. Rather, these specifics are provided for explanatory purposes that help the invention to be better understood.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As stated above, the present invention may be embodied as, among other things: a method, system, or computer-program product that is implemented as software, hardware or a combination of the two, or as computer-readable media having computer-usable instructions embodied thereon. In these embodiments, an exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Figure 1:
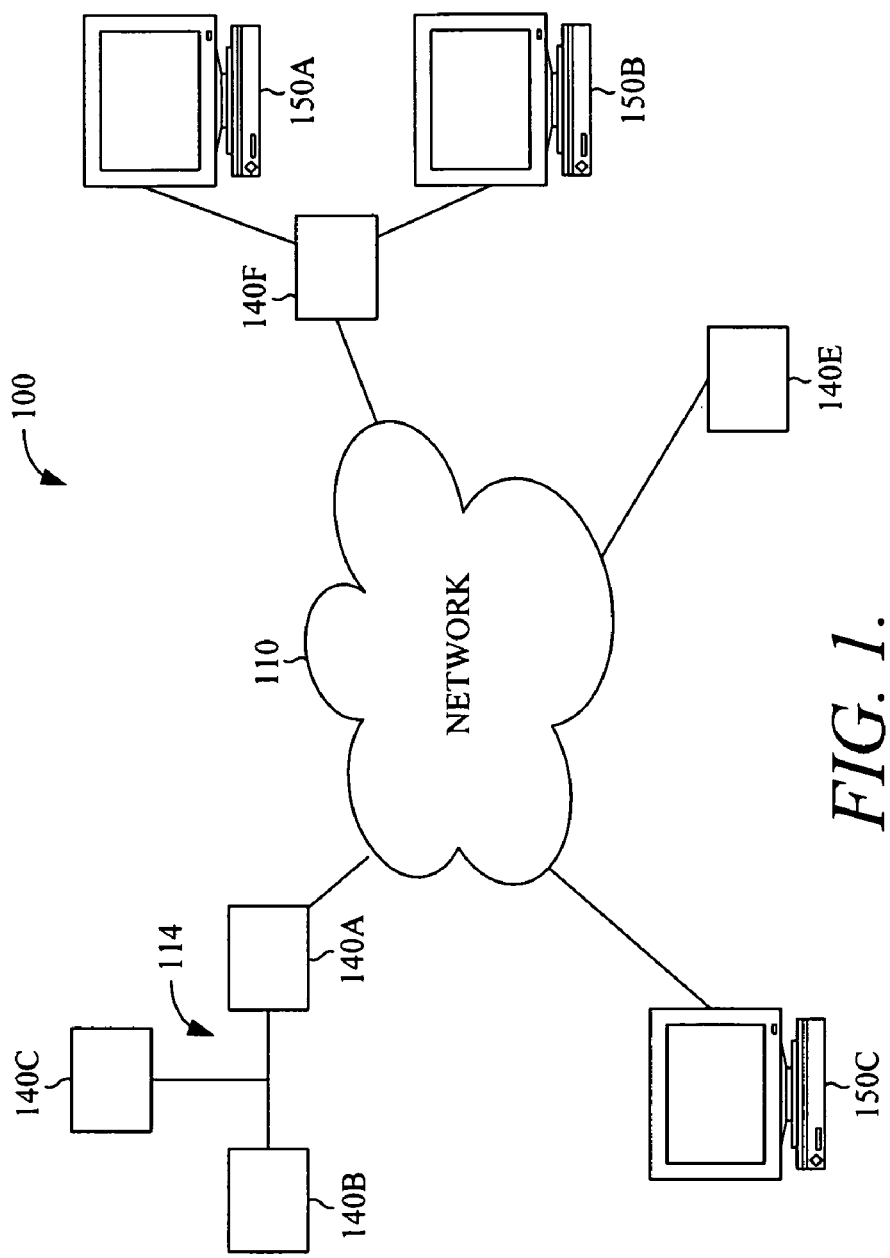
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
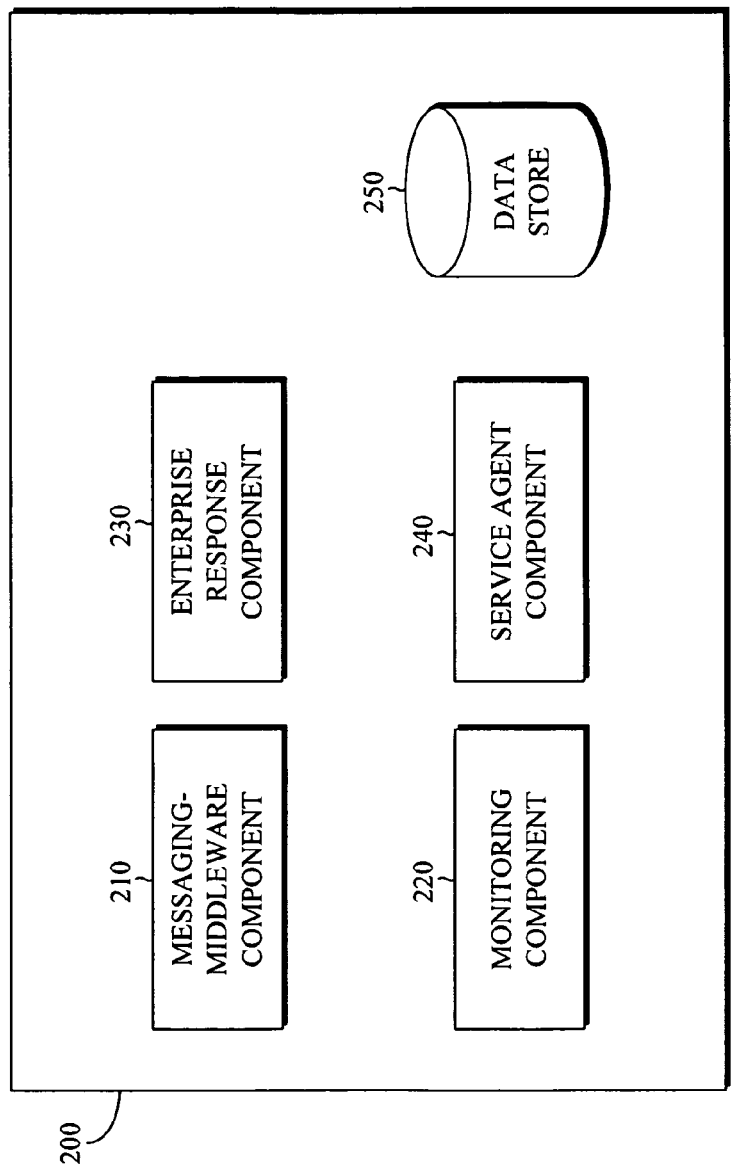
FIG. 2 is a drawing of an operating environment in which an embodiment of the present invention may be practiced.

Turning now to FIG. 2, a block diagram depicts an exemplary computing system architecture 200 suitable for automatically rerouting messages to other instances of a queue by disabling an instance of the queue. It will be understood and appreciated by those of ordinary skill in the art that the exemplary computing system architecture 200 shown in FIG. 2 is merely an example and is not intended to suggest any limitation as to the scope of the use or functionality of the present invention. Neither should the exemplary computing system architecture 200 be interpreted as having any dependency or requirement related to any single component or combination of components illustrated therein.

Exemplary computing system architecture 200 includes a messaging-middleware component 210, a monitoring component 220, an enterprise response component 230, a service agent component 240 and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a message-oriented middleware) include IBM's WebSphere® MQ (formerly MQ Series®), Fiorano's MQ, Oracle Advanced Queuing (AQ), and Microsoft's MSMQ. The messaging-middleware component 210 can be any application that uses queues to transfer messages from one application to another. For example, information from a front end application is formed into one or more messages. These messages from the front end application will be placed in a sending queue, within the messaging-middleware component 210, and transferred by the messaging-middleware component 210 into a receiving queue within the messaging-middleware component 210. A back end program will then retrieve the message from the receiving queue. The message is transmitted through channels within the messaging-middleware component 210. In this example, the front end program and the backend program could be located on any computing device communicatively coupled to the one or more computers on which the messaging-middleware component 210 resides. A messaging-middleware client may reside on the computing device one which the front end and back end programs reside to allow interaction with the messaging middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously a queue transfers messages between two programs. Parallel queue instances transfer the same type of message between the same two programs, but are managed by separate messaging-middleware components. Thus, if eight messaging-middleware components were operating in parallel, then eight parallel instances would exist. One instance would be in each of the eight messaging-middleware components. In this application, the primary queue instance is one of the parallel queue instances that embodiments of the present invention evaluate to determine if the primary queue instance should be disabled. Programs transferring messages to the parallel queue instances may use an algorithm to determine which queue instance to send the message to. In one embodiment, the amount of messages sent to each parallel queue instance is about the time over time.

The queues within the messaging-middleware component 210 are described by a series of attributes. Each attribute has an associated value or setting. For example, one attribute could be a queue name and the associated setting could be "SprintBillinginfol." Some attributes are preset, while other attributes measure current conditions within the queue and change over time. For example, the queue name attribute is preset, but the current queue depth attribute changes based on the number of messages in the queue. Throughout this disclosure preset attributes will be associated with settings, and attributes that are based on queue conditions are associated with attribute values. The primary attribute settings and values that are involved in embodiments of the present invention include a message in value, a message out value, a reset time interval setting, an outgoing processes value, and an enablement setting. Many other attributes may be used to describe a queue and may be accessed or modified in embodiments of the present invention.

The above mentioned attributes and settings are related to the amount of information or data entering and leaving a queue. The amount of information entering or leaving a queue may be measured in a variety of units of measure including the number of messages or bytes of data. Throughout this description the amount of information will be described in terms of messages, but the invention is not intended to be limited to measuring the information entering and leaving a queue in terms of messages. A queue has a capacity to hold a limited amount of information, which may be referred to as the maximum queue depth. The maximum allowable depth setting is the maximum amount of information the queue can hold before incoming messages are turned away. The current depth value is the current amount of information in the queue.

The message in value is the amount of messages that have entered the queue since a reset period. Once the time period is reset, the message in value is reset to zero and increases with each message that enters the queue. The message out value is the amount of messages that have exited the queue since the reset period. The reset time interval value is the time period after which the message in value and the message out value are reset. In one embodiment, the message in value is called the enqueue rate and the message out value is called the dequeue rate.

Monitoring component 220 is configured to monitor messaging-middleware objects (e.g., channels and queues) for upset conditions that may require corrective actions. Examples of commercially available monitoring components include HP Openview®, Q Pasa!® by MQSoftware, Candle's PathWAI, and BMC Patrol. The monitoring component 220 may retrieve, store, and evaluate queue values periodically to ascertain whether an upset condition is present. For example, the current depth of the queue could be retrieved periodically. Having retrieved one or more attribute values, the one or more attribute values may be evaluated against threshold values within the monitoring component 220. The monitoring component 220 may generate an alarm or incident message if attribute values exceed the threshold. The monitoring component 220 may perform one or more calculations with the one or more attribute values to arrive at a value that is compared against a threshold template. For example the monitoring component 220 may calculate the message throughput by dividing the outgoing messages during a period of time by the incoming messages during the period of time. The message throughput may then be compared against a threshold throughput, such as 50%, and an incident message generated if the message throughput is less than the threshold throughput.

The monitoring component 220 is also configured to generate and transmit notifications describing potential malfunctions within a queue. In one embodiment, the information about the potential malfunction is transmitted to enterprise response component 230. In another embodiment, the monitoring component 220 directly notifies a designated responder or service agent component 240 about the upset condition.

Enterprise response component 230 is configured to coordinate a response to a malfunction detected in a queue. The enterprise response component 230 may receive information regarding a malfunction from a monitoring component 220 or another source. Upon receiving notification of a malfunction, the enterprise response component 230 may page a designated responder to investigate the upset condition. A designated responder may be an individual person or group of people given responsibility to fix upset conditions within certain queues. In another embodiment, the designated responder may be a computer application that takes corrective actions, such as service agent component 240. In an embodiment of the present invention, upon receiving an indication that message throughput is less than a threshold throughput, the response component 230 instructs the service agent component 240 to disable the specific queue instance if a series of conditions are satisfied. Disabling a specific queue instance (the primary queue instance) has the effect of routing messages away from the specific queue instance toward other parallel queue instances.

Service agent component 240 disables a queue instance upon making a series of determinations indicating that disabling the queue instance is the appropriate response to the decreased throughput in the queue instance. The queue instance being evaluated by the service agent component 240 is described as the primary queue instance throughout this description. In one embodiment, the malfunction is detected by monitoring component 220. The monitoring component 220 may monitor the throughput of a queue instance. The throughput is the percentage of messages entering the queue during a time period that leave the queue during the time period. If the throughput is less than a throughput threshold, the monitoring component 220 generates an incident alarm and forwards it to the enterprise response component 230. In another embodiment, the monitoring component 220 directly instructs the service agent component 240 to begin the process of determining if disabling the queue is the appropriate response to the incident. In the embodiment where the enterprise response component 230 receives the incident message first, the enterprise response component 230 may send a request back to the monitoring component 220 to generate an instruction for the service agent component 240 to begin a determination of whether disabling the queue is the appropriate response to the decreased throughput. Or, enterprise response component 230 may send an instruction directly to the service agent component 240 instructing it to begin the process of determining whether disabling the queue instance is the appropriate response to the decreased throughput in the queue instance. Other methods of instructing the service agent component 240 are also possible.

Upon receiving an instruction to determine if the primary queue instance should be disabled, the service agent component 240 makes a series of determinations. Embodiments of the invention are not dependent upon the order in which the determinations are made. If the service agent component 240 is unable to make any of the determinations then the primary queue instance is not disabled. The service agent component 240 determines whether the throughput in the primary queue instance is below the throughput threshold. The service agent component 240 may directly interact with the messaging-middleware component 210 to retrieve the message in value and the message out value for the primary queue instance. The message in and message out values are used to determine the current throughput. As described previously, the throughput is measured over a period of time such as one minute or two minutes. Other periods of time may also be utilized. Making this determination confirms the initial incident message is accurate and that the conditions causing decreased throughput still exist. If the throughput is greater than the threshold throughput then the primary queue instance is not disabled.

The service agent component 240 also determines whether greater than a threshold number of application interfaces are operating to remove messages from the primary queue instance. Application interfaces are programs associated with individual queue instances to transfer messages from the queue instance to a receiving application. The receiving application is the program that receives messages from the queue instance. If less than a threshold number of application interfaces are operating, the service agent component 240 may increase the number of application interfaces operating in association with the queue instance in an effort to increase the primary queue instance's throughput. After adding additional application interfaces, the service agent component 240 recomputes the throughput of the queue instance to determine if the throughput is still less than the throughput threshold. If the throughput is still less than the throughput threshold, additional application interfaces may be added. In one embodiment, the service agent component 240 adds application interfaces and rechecks the throughput until either the throughput is greater than the threshold throughput or the number of application interfaces operating is greater than the threshold number. In one embodiment, the threshold number of application interfaces is the maximum number of application interfaces able to effectively operate in association with a single queue instance. Upon determining that the throughput is less than the threshold throughput and greater than a threshold number of application interfaces that are running, the service agent component 240 proceeds to make additional determinations.

The service agent component 240 also determines if the primary queue instance is externally oriented. A queue instance is externally oriented if messages are transmitted from the queue instance to only a single backend application. In contrast, an internally oriented queue instance may transfer messages to both a backend application and to additional queue instances that in turn transmit the messages to additional backend applications. In essence, an internally oriented queue instance copies the messages to other queues to be transferred to additional backend programs. The primary queue instance is not disabled if the primary queue instance is internally oriented.

Service agent component 240 also determines whether the parallel queue instances remaining available if the primary queue instance is disabled, have an aggregated capacity to handle the expected message throughput during the period of time the primary queue instance may be disabled. The service agent component 240 may determine that parallel queue instances are available by contacting service agents associated with those parallel queue instances. A parallel queue instance is available if it is not disabled and not in alarm status. The aggregate capacity of the parallel queues is calculated by determining how many parallel queues are presently available and multiplying that number times a historical throughput capability for the parallel queues. In some embodiments, a theoretical throughput for the parallel queues may be used to determine the aggregate capacity rather than or in combination with the historical throughput capacity. The aggregate capacity does not include the historical or theoretical capacity of the primary queue instance. The historical or theoretical capacity of the parallel queues may be specifically determined based on the time period in which the primary queue may be disabled. The number of application interfaces operating in association with a queue instance may change throughout the day based on expected message throughputs. For example, the capacity of a queue instance may be reduced at night by decreasing the number of application interfaces running in association with the queue instance. Similarly, the service agent component 240 retrieves the expected aggregate throughput for the parallel queue instances for the time period during which the primary queue instance may be disabled. The historical data regarding queue capacity and message throughput demand may be retrieved from a data store that is accessible to all service agents operating in the network.

If the expected aggregate throughput is greater than the calculated aggregate throughput capacity, the primary queue instance is not disabled. The primary queue instance is not disabled because whatever reduced throughput capacity it is providing is still needed to handle the expected aggregate throughput for the parallel queue instances.

Additionally, the backend system status for the primary queue instance is checked. If the backend system is malfunctioning the problem may not be with the primary queue and disabling the primary queue is not the best course of action. Accordingly, if the backend system is malfunctioning, the primary queue instance is not disabled.

Upon making the previous determinations, specifically that the throughput for the primary queue is less than a threshold throughput, that greater than a threshold number of application-interfaces are operating in association with the primary queue instance, the aggregate capacity of the remaining parallel queues is greater than the expected throughput demand, and the backend system is functioning normally, then the service agent component 240 disables the primary queue. The primary queue may be disabled in a number of ways, including turning the setting that allows messages to be written to the queue to off or removing the primary queue instance from the cluster attribute that distributes messages to the parallel queue instances. In one embodiment, the queue is disabled by changing the put setting to disabled.

The data store 250 is configured for storing information related to a queue including historical performance data and queue settings.

Figure 3:
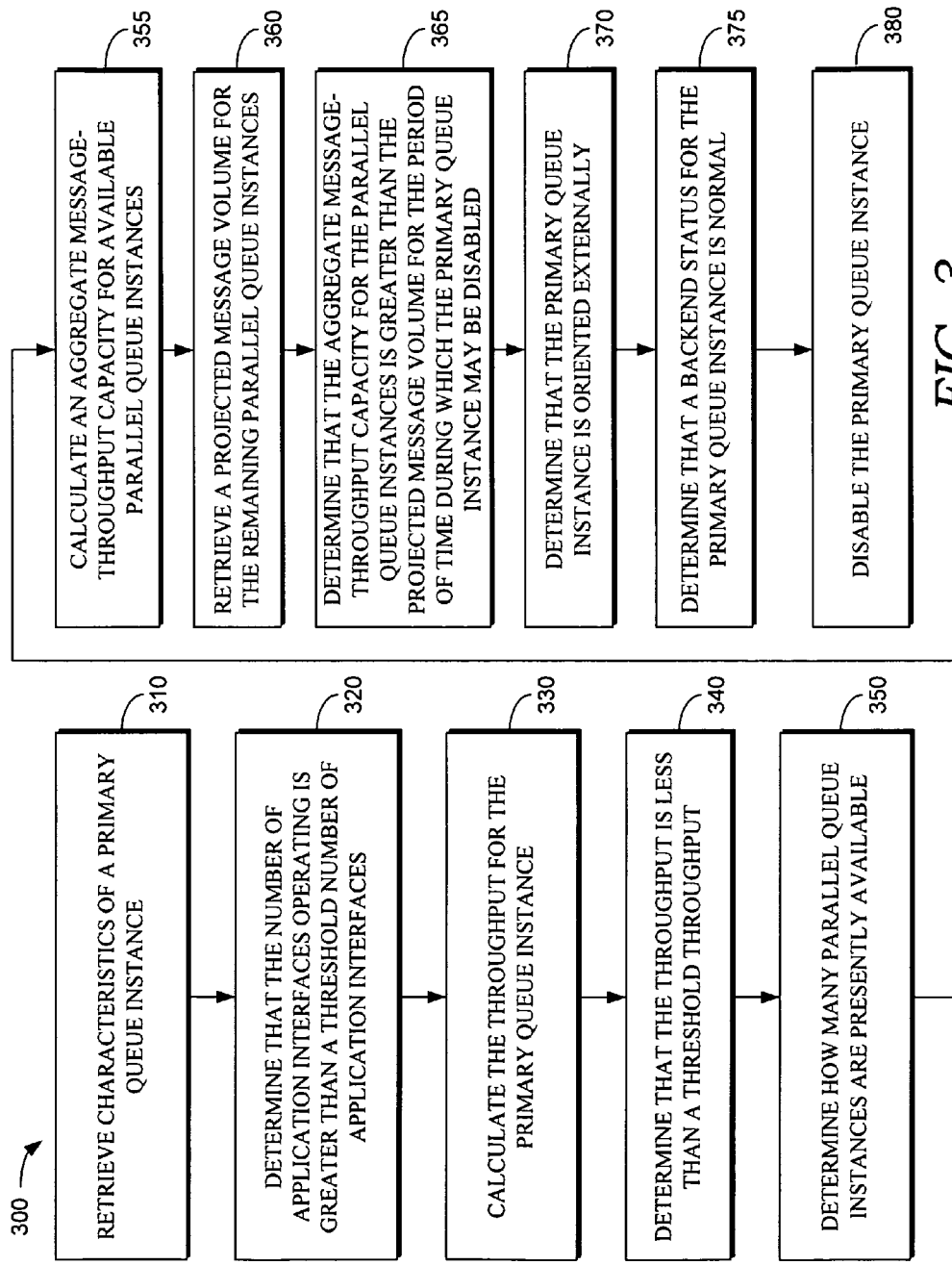
FIG. 3 is a flow diagram in which a method of automatically disabling a primary queue instance in response to a decrease in throughput for the primary queue instance is described according to an embodiment of the present invention.

Turning now to FIG. 3, a method of automatically disabling an instance of a queue in a response to a decrease in throughput for the instance is shown in accordance with embodiments of the present invention. At step 310, characteristics of the instance are retrieved. Retrieved characteristics include the number of messages entering the primary queue instance during a period of time and the number of messages exiting the primary queue instance during a period of time. As described previously, these characteristics may be retrieved directly from a queue manager, such as messaging-middleware component 210 or from a monitoring component 220 that is collecting the characteristics. Other characteristics retrieved include the number of application interfaces operating to remove messages from the primary queue instance. The number of application interfaces operating in association with the primary queue instance may be retrieved from a messaging-middleware component 210 or other component with knowledge of the primary queue instance.

At step 320, it is determined that the number of application interfaces operating to remove messages from the primary queue instance is greater than a threshold number. At step 330, the throughput rate for the primary queue instance is calculated using the number of messages entering the primary queue instance and the number of messages exiting the primary queue instance during a period of time. The throughput may be calculated by dividing the messages leaving the queue during a time period by the messages entering the queue during the time period. At step 340, it is determined that the message throughput of the primary queue instance is less than a throughput threshold value.

At step 350, it is determined how many parallel queue instances are presently available. A parallel queue instance is available if it is online and not alarming. At step 355, an aggregate message-throughput capacity for the remaining available parallel queue instances is calculated. The aggregate message-throughput capacity is the total combined throughput capacity for the available parallel queue instances. As described previously, the individual throughput capacity for a parallel queue may be based on a theoretical capacity or a historically observed capacity.

At step 360, a projected message volume across the parallel queue instances plus the primary queue instance is retrieved. The projected message volume is based on the same period of time during which the aggregate message-throughput is calculated. In one embodiment, the projected message volume is retrieved from a data store containing a historical analysis of message volumes through the queue instances during different time periods during a day, week, or year. At step 365, the aggregate message-throughput capacity for the available parallel queue instances is determined to be greater than the projected message volume. As described previously, if the projected message volume is greater than the aggregate message-throughput capacity then the primary queue instance is not disabled.

At step 370, the primary queue instance is determined to be oriented externally. As described previously, a queue instance is oriented externally if the messages from the queue are transferred to a single backend application. This is in contrast to an internally oriented queue where messages are transferred to two or more backend applications.

At step 375, it is determined that the backend status for the primary queue instance is normal. If the backend status for the primary queue instance is not normal, a system problem apart from the primary queue instance is likely to exist. Accordingly, the primary queue instance is not disabled if the backend status for the primary queue instance is abnormal. At step 380, upon making the determinations of steps 320, 340, 365, 370, and 375, the primary queue instance is disabled.

Figure 4:
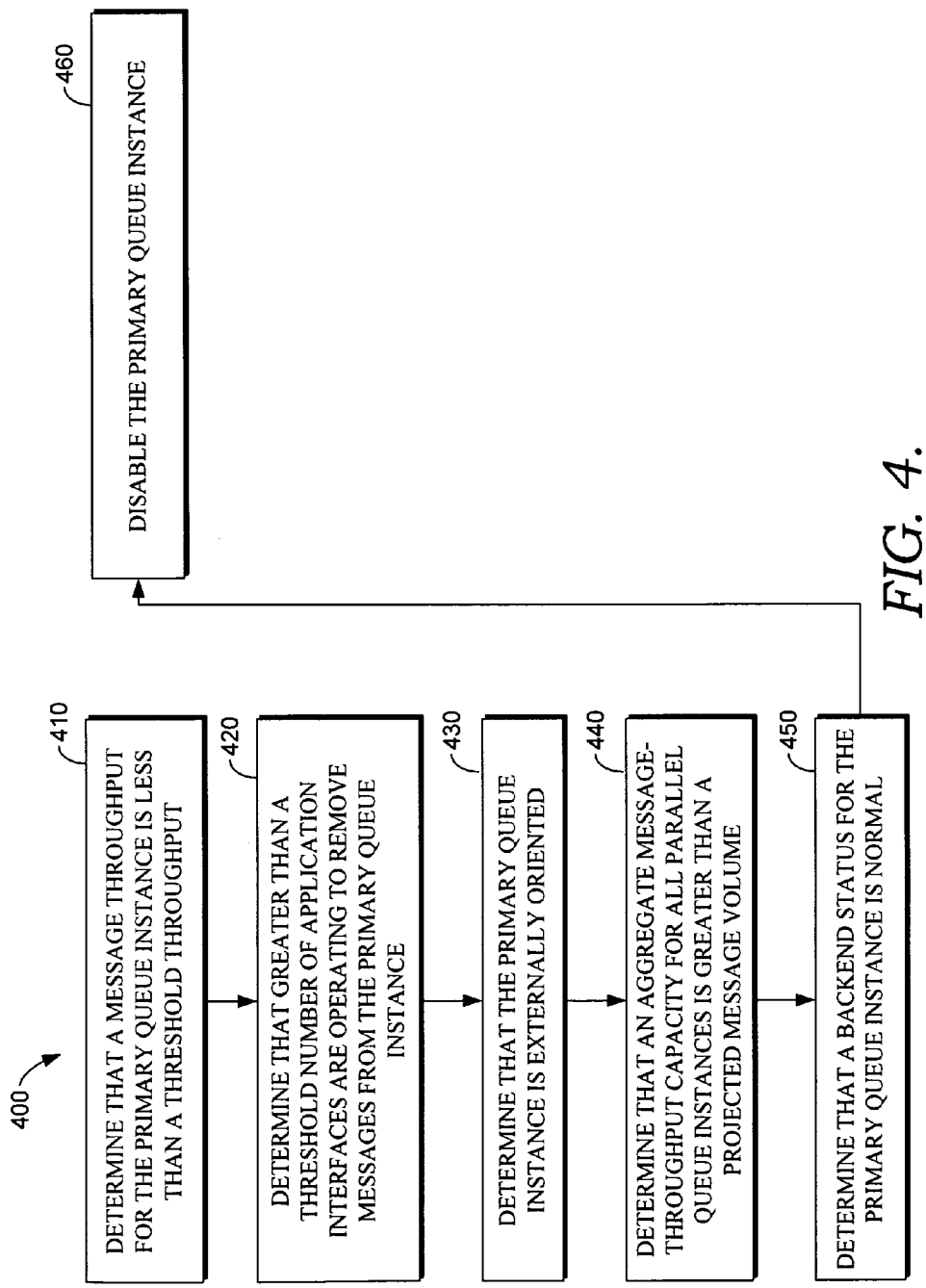
FIG. 4 is a flow diagram in which a method of terminating a primary queue instance that has at least one parallel queue instance when a malfunction condition in the primary queue instance is detected is described according to an embodiment of the present invention.

Turning now to FIG. 4, a method of terminating a primary queue instance, which has at least one parallel queue instance, upon an occurrence of a malfunction condition in the queue instance is described in accordance with an embodiment of the present invention. At step 410, the message throughput for the primary queue instance is determined to be less than a threshold message throughput. As described previously, the message throughput is determined based upon the messages entering and leaving the queue during a period of time. At step 420, greater than a threshold number of application interfaces are determined to be operating to remove messages from the primary queue instance. The application interfaces are programs that facilitate the transfer of messages out of the primary queue instance and into a backend application or a queue associated with a backend application. Other intermediary components between the primary queue instance and the backend application are also possible.

At step 430, the primary queue instance is determined to be externally oriented. As described previously, a queue is externally oriented if the messages from the queue instance are transferred only to one backend application. As described previously, the transfer does not need to be directly to a backend application but eventually only one backend application receives the message from an externally oriented queue.

At step 440, an aggregate message-throughput capacity for all parallel instances of the primary queue instance is determined to be greater than a projected message volume over the same period of time. At step 450, it is determined that the backend status for the primary queue instance is normal. At step 460, upon making the determinations described in step 410, 420, 430, 440, and 450, the primary queue instance is disabled. In one embodiment, the queue instance is disabled by changing the put setting on the primary queue instance.

Figure 5:
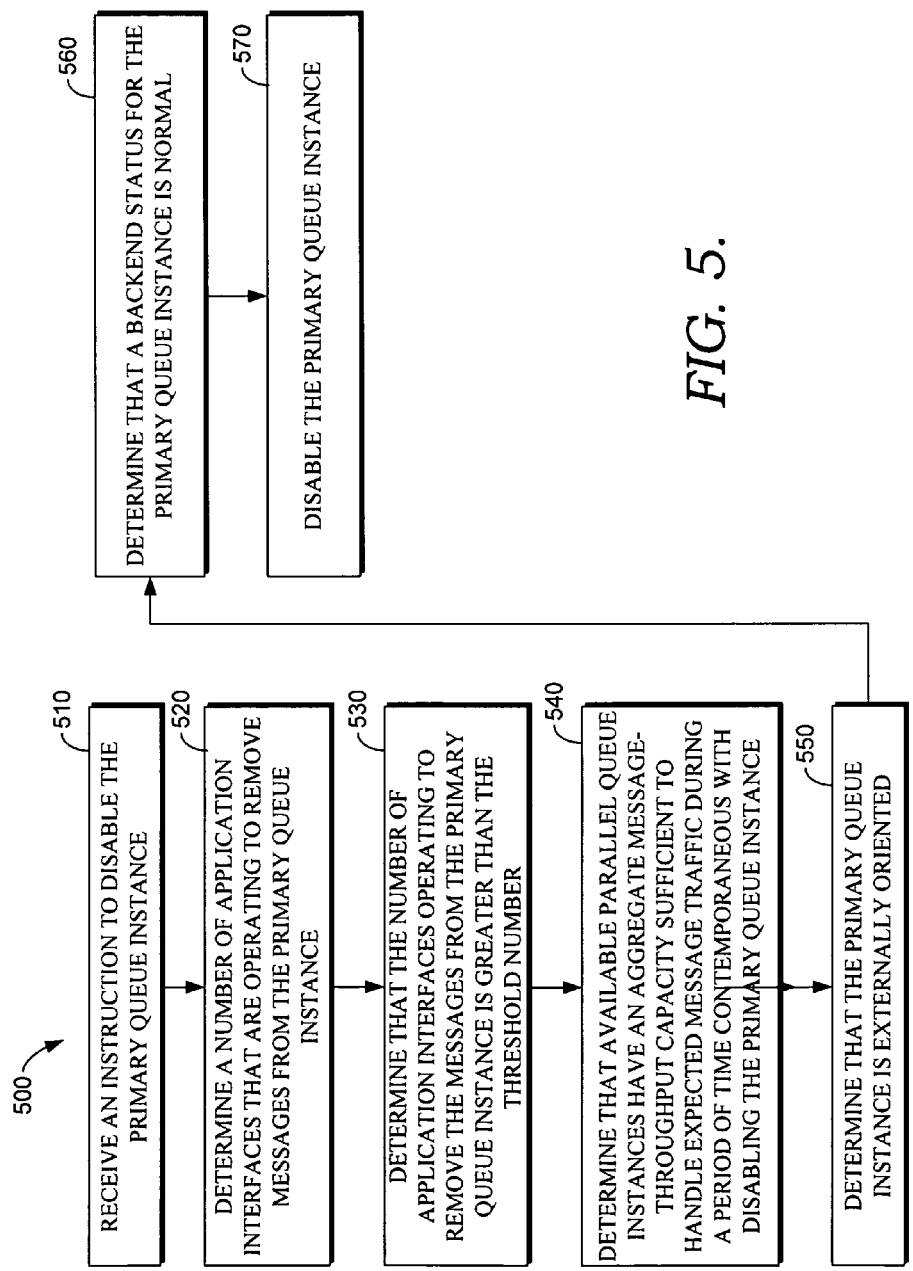
FIG. 5 is a flow diagram in which a method of disabling a primary queue instance upon receiving an indicating the primary queue instance is malfunctioning is described according to an embodiment of the present invention.

Turning now to FIG. 5, a method of disabling a queue instance upon receiving an indication that the queue instance is malfunctioning is described in accordance with embodiments of the present invention. At step 510, an instruction to disable the primary queue instance is received. At step 520, the number of application interfaces that are operating to remove messages from the primary queue instance is determined. If the number of application interfaces is less than a threshold number, then additional application interfaces are activated and the message throughput for the primary queue instance is redetermined. Additional application interfaces are activated until the number of application interfaces that are operating reaches the threshold number or the message throughput for the primary queue instance is greater than the threshold throughput. If the message throughput for the primary queue instance is greater than the threshold throughput, then the primary queue instance is not disabled.

At step 530, the number of application interfaces operating to remove messages from the primary queue instance is determined to be greater than the threshold number. As described previously, this determination may be made in conjunction with step 520 after several application interfaces have been activated. In one embodiment, the number of application interfaces operating is determined by retrieving the IP_Proc attribute value from the queue manager associated with the primary queue instance. At step 540, the available parallel instances are determined to have an aggregate message-throughput capacity to handle expected message volume during a period of time contemporaneous with disabling the primary queue instance. The available parallel instances will have sufficient capacity to handle the expected message traffic during a period of time contemporaneous with disabling the primary queue instance if the aggregate message-throughput capacity is greater than the expected message traffic.

At step 560, the primary queue instance is determined to be externally oriented. At step 570, the backend status for the primary queue instance is determined to be normal. At step 580, the primary queue instance is disabled.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of automatically disabling a primary queue instance in response to a decrease in throughput for the primary queue instance, the method comprising:

retrieving characteristics of the primary queue instance including a number of messages entering the primary queue instance during a period of time, a number of messages exiting the primary queue instance during the period of time, and a number of application interfaces operating to remove messages from the primary queue instance;

determining that the number of application interfaces operating is greater than a threshold number of application interfaces;

calculating the throughput for the primary queue instance using the number of messages entering the primary queue instance and the number of messages exiting the primary queue instance;

determining that the throughput is less than a threshold throughput;

determining how many parallel queue instances are presently available, wherein a parallel queue instance is available if the parallel queue instance is online and not alarming, and wherein the parallel queue instances and the primary queue instance facilitate transmission of a first type of message between a first program and a second program;

calculating an aggregate message-throughput capacity for available parallel queue instances;

retrieving a projected message volume across the parallel queue instances plus the primary queue instance for a period of time during which the primary queue instance may be disabled;

determining that the aggregate message-throughput capacity for the parallel queue instances is greater than the projected message volume for the period of time during which the primary queue instance may be disabled;

determining that the primary queue instance is oriented externally, wherein the primary queue instance is oriented externally if the messages from the primary queue instance are transferred to a single backend application;

determining that a backend status for the primary queue instance is normal; and upon making the above determinations, changing an enablement status of the primary queue instance to disabled.

2. The media of claim 1, wherein the number of application interfaces operating to remove the messages from the primary queue instance is determined by reading an attribute value indicating how many application interfaces are operating in association with the primary queue instance.

3. The media of claim 1, wherein the throughput threshold is 50%.

4. The media of claim 1, determining how many of the parallel queue instances are presently available includes communicating with a service agent associated with each of the parallel queue instances.

5. The media of claim 4, wherein the parallel queue instance is online if one or more of the primary queue instance setting that allows the messages to be written to the parallel queue instance is enabled and if the parallel queue instance is defined in a cluster attribute, wherein the cluster attribute contains information about queue instances that are visible to a program sending messages to the queue instances.

6. The media of claim 4, wherein the method further includes increasing the number of application interfaces operating in association with the primary queue instance until the threshold number of application interfaces is reached.

7. The media of claim 1, wherein calculating an aggregate message-throughput capacity for available parallel queue instances includes adding a historical capacity of each of the available parallel queue instances, wherein the historical capacity is retrieved from a performance data store that records queue performance information.

8. One or more non-transitory computer-readable media having computer-executable instructions embodied thereon for performing a method of terminating a primary queue instance that has at least one parallel queue instance when a malfunction condition in the primary queue instance is detected, the method comprising:
  determining that a message throughput for the primary queue instance is less than a threshold throughput;
  determining that greater than a threshold number of application interfaces are operating to remove messages from the primary queue instance;
  determining that the primary queue instance is externally oriented, wherein the primary queue instance is externally oriented if the messages from the primary queue instance are transferred to only one backend application;
  determining that a aggregate message-throughput capacity for all parallel queue instances is greater than a projected message volume, wherein the aggregate message-throughput capacity and the projected message volume are both based on a single time period;
  determining that a backend status for the primary queue instance is normal; and
  upon making the above determinations, disabling the primary queue instance.

9. The media of claim 8, wherein determining that the message throughput for the primary queue instance is less than the threshold throughput includes:
  receiving a number of messages that entered the primary queue instance during a time period;
  receiving a number of messages that existed the primary queue instance during the time period;
  calculating a throughput percentage by dividing the number of messages that exited the primary queue instance by the number of messages that entered the primary queue instance; and
  comparing the throughput percentage with the threshold throughput.

10. The media of claim 8, wherein determining that greater than the threshold number of application interfaces are operating to remove the messages from the primary queue instance includes:
  retrieving an attribute value from a queue manager that indicates how many of application interfaces are operating to remove the messages from the primary queue instance; and
  comparing the attribute value with the threshold number of application interfaces.

11. The media of claim 8, wherein determining that the primary queue instance is externally oriented includes retrieving orientation information from a data store.

12. The media of claim 8, wherein determining that the aggregate message-throughput capacity for all parallel queue instances is greater than the projected message volume includes:
  retrieving throughput capacity information for each parallel queue instance from a data store;
  retrieving availability status information for each parallel instance of the primary queue instance, wherein a parallel instance is available if it is active and not alarming;
  determining the aggregate message-throughput capacity by adding message throughput capacities for each presently available parallel queue instance;
  retrieving the projected message volume for the parallel queue instances and the primary queue instance from a data store containing projected message volumes calculated based on historical queue message volume data; and
  comparing the aggregate message-throughput capacity with the projected message volume.

13. The media of claim 12, wherein the method further includes activating additional application interfaces for the primary queue instance until the threshold number of application interfaces is reached.

14. One or more non-transitory computer-readable media having computer-executable instructions embodied thereon for performing a method of disabling a primary queue instance upon receiving an indicating the primary queue instance is malfunctioning, the method comprising:
  receiving an instruction to disable the primary queue instance;
  determining a number of application interfaces that are operating to remove messages from the primary queue instance,
    (1) if the number of application interfaces is less than a threshold number, then activating an additional application-interface instance and determining a message throughput for the primary queue instance,
    (2) activating additional application interfaces until the number of application interfaces that are operating reaches the threshold number or the message throughput for the primary queue instance is greater than a threshold throughput;
  determining that the number of application interfaces operating to remove the messages from the primary queue instance is greater than the threshold number;
  determining that available parallel queue instances have an aggregate message-throughput capacity sufficient to handle expected message traffic during a period of time contemporaneous with disabling the primary queue instance;
  determining that the primary queue instance is externally oriented, wherein the primary queue instance is externally oriented if the messages from the primary queue instance are transferred to a single backend application;
  determining that a backend status for the primary queue instance is normal; and
  disabling the primary queue instance.

15. The media of claim 14, wherein determining the message throughput for the primary queue instance includes:
  receiving a number of messages that entered the primary queue instance during a time period;
  receiving a number of messages that existed the primary queue instance during the time period; and
  calculating the message throughput by dividing the number of messages that exited the primary queue instance by the number of messages that entered the primary queue instance.

16. The media of claim 15, wherein determining that available parallel queue instances have the aggregate message-throughput capacity sufficient to handle expected message traffic during the period of time contemporaneous with disabling the primary queue instance includes:
  retrieving throughput capacity information for each parallel queue instance from a data store;

retrieving availability status information for each parallel instance of the primary queue instance, wherein a parallel instance is available if it is active and not alarming;

determining the aggregate message-throughput capacity by adding message throughput capacities for each presently available parallel queue instance;

retrieving a projected message volume for the parallel queue instances and the primary queue instance from a data store containing projected message volumes calculated based on historical queue message volume data; and comparing the aggregate message-throughput capacity with the projected message volume.

17. The media of claim 16, wherein determining which instances within a plurality of parallel instances are presently available includes communicating with a service agent associated with each of the parallel queue instances.

18. The media of claim 14, wherein determining that the number of application interfaces operating to remove the messages from the primary queue instance is greater than the threshold number includes retrieving an attribute value from a queue manager that indicates the number of application interfaces operating in association with the primary queue instance.

19. The media of claim 14, wherein a queue instance is enabled if one or more of a setting that allows messages to be written to the queue instance is enabled and if the queue instance is defined in a cluster attribute, wherein the cluster attribute contains information about the queues instance that are visible to a program sending messages to queue instances.

20. The media of claim 14, where determining that the primary queue instance is externally oriented includes retrieving orientation information for the primary queue instance from a data store.

* * * * *